United States Patent [19]

Pigott et al.

[11] Patent Number: 4,795,075
[45] Date of Patent: Jan. 3, 1989

[54] HOLDING APPARATUS FOR A VEHICLE ASSEMBLY LINE

[75] Inventors: Norman B. Pigott, Bishop's Stortford; George A. Roberts, Luton, both of United Kingdom

[73] Assignee: Litton U.K. Limited, Buckinghamshire, England

[21] Appl. No.: 79,799

[22] Filed: Jul. 18, 1987

[30] Foreign Application Priority Data

Mar. 28, 1987 [GB] United Kingdom ................ 8707478

[51] Int. Cl.⁴ .................................................. B23K 37/04
[52] U.S. Cl. ...................................... 228/45; 228/47; 219/80; 269/47
[58] Field of Search ................... 228/4.1, 49.1, 45, 47; 219/79, 80, 86.24; 269/47, 48.1

[56] References Cited

U.S. PATENT DOCUMENTS

| | | | |
|---|---|---|---|
| 2,215,693 | 9/1940 | Fleming et al. | 219/86.24 |
| 4,162,387 | 7/1979 | DeCandia | 219/79 |
| 4,316,072 | 2/1982 | Arnoldt | 219/86.24 |
| 4,659,895 | 4/1987 | Di Rosa | 219/86.24 |
| 4,667,866 | 5/1987 | Tobita et al. | 228/47 |

FOREIGN PATENT DOCUMENTS

| | | | |
|---|---|---|---|
| 1461432 | 1/1977 | United Kingdom | 228/45 |
| 2075437 | 4/1981 | United Kingdom . | |
| 2114067 | 12/1982 | United Kingdom . | |

*Primary Examiner*—Nicholas P. Godici
*Assistant Examiner*—Samuel M. Heinrich
*Attorney, Agent, or Firm*—Oldham & Oldham

[57] ABSTRACT

Apparatus for holding a partly assembled vehicle body (13) includes a main framework structure (3) supported on two pairs of pillars (1), the structure being mounted about a horizontal pivot (5) on the rear pair of pillars for up and down pivotal movement. Mounted on the structure (3) are a pair of outwardly moveable inner frames (9) carrying clamps (11) which are isertable through the upper aperture(s) in the body (e.g. the space subsequently to be filled by the windscreens and/or roof panel), enabling the body to be clamped from inside to give free access to outside workers or robots (21). The frames may also carry dedicated tooling, such as a spot welder.

13 Claims, 3 Drawing Sheets

HOLDING APPARATUS FOR A VEHICLE ASSEMBLY LINE

FIELD OF THE INVENTION

The present invention relates to holding apparatus for holding a partly assembled vehicle. Typically, it would form part of a work station or "gate" in a motor vehicle assembly line.

BACKGROUND OF THE INVENTION

It is known to provide holding or clamping means at a work station in a motor vehicle assembly line. Typically, a partially assembled body shell of the vehicle would be moved to the work station and located in the correct position. The holding or clamping means would then approach either side of the body shell and hold it in position. With the body shell thus held, assembly operations such as welding, attachment of parts etc is carried out.

SUMMARY OF THE INVENTION

The present invention provides holding apparatus having vehicle holding means mounted on a holding structure, which is arranged so that in use the vehicle and the apparatus are moved relative to one another so that the holding means pass into the vehicle body through an aperture in the vehicle body. The holding means are then moved outwardly to approach the sides of the vehicle body from the inside. When they reach the vehicle body, the holding means operate to hold or clamp it.

Typically, the holding means will enter the vehicle body from above, such as by passing through an aperture in the vehicle body where a roof panel is later to be fitted. Either the holding means may be lowered into the vehicle body or the vehicle body may be raised to pass round the holding means. Alternatively, the holding means may enter the vehicle body through window apertures or from beneath in the case of a vehicle body which does not include a floor panel.

The arrangement of the present invention has a number of advantages over the conventional clamping apparatus. These advantages flow principally from the fact that the holding means is located inside the vehicle body and so does not obstruct the performance of assembly tasks being applied to the vehicle body from the outside.

Currently, there is a demand for vehicle assembly lines in which different models of motor vehicles can be assembled using the same assembly line. However, the arrangement of holding means will almost always have to be different for the different models. This applies even to such minor variations as performing assembly of saloon or sedan and estate or station wagon versions of the same motor car on the same assembly line. In this case, the body strut behind the rear doors of the vehicle will normally be in a different position in the two cases, and so a holding means which clamps that strut will have to be moved between the appropriate position for one type of car and an appropriate position for the other.

It is possible to arrange the structure of vehicle holding apparatus so that the positions of the holding means are variable, to accommodate this type of situation. However, the additional complexity in the structure is accompanied by additional bulk. If the holding means have approached the vehicle body from the outside this additional bulk will be located outside the vehicle body and will obstruct work on the vehicle body. This problem is exacerbated when assembly operations are carried out by robots, as is often considered desirable these days for other reasons. An assembly line robot will be programmed to perform a particular set of movements and operations. However, if the location of a vehicle body holding means is going to vary, it must be ensured that the holding means is not moved into the path of one of the movements of the robot.

If the holding means are arranged to pass into the body shell and approach the vehicle sides from inside the body, then the additional bulk of any variable positioning means is less of an obstruction, and the problem of the holding means moving into the path of the movements of robots located outside the vehicle body does not arise.

Additionally, it is sometimes necessary to perform assembly operations from inside a vehicle body, such as welds located inside the boot space of a saloon or sedan car. It is often very inconvenient to have to approach welding spots from inside the vehicle body whether the welding is being carried out by robots or by people. When the present invention is being used, it can be possible to improve this situation by mounting a tool such as a dedicated spot welder on the holding apparatus, so that this tool passes into the vehicle body and approaches the appropriate spot in the same manner as the holding means.

An embodiment of the present invention, given by way of non-limiting example, will now be described with reference to the accompanying drawings, in which.

DETAILED DESCRIPTION OF THE DRAWINGS

Figure 1:
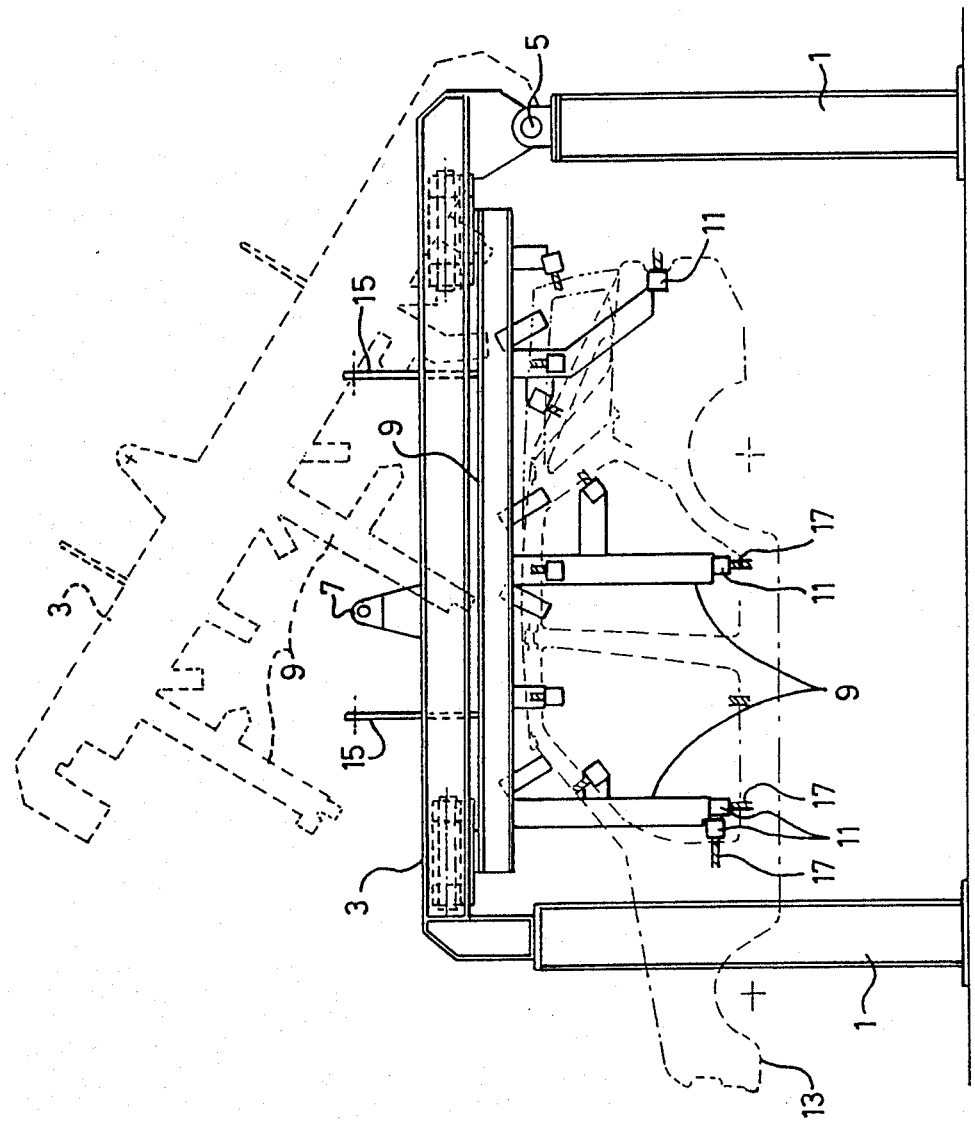
FIG. 1 is a side view of holding apparatus embodying the present invention.

A vehicle body holding apparatus has a fixed stand 1 comprising four pillars arranged in front and rear pairs. The stand 1 supports a main framework 3 which rests upon one pair of the pillars of the stand 1, and is pivoted to the other pair of pillars at 5. A hydraulic cylinder or other lifting means is connected to the framework at a connection point 7. In this way, the framework can be rotated upwards around the pivot 5 to adopt the raised position shown in broken lines in FIG. 1.

An inner framework 9 extends downwardly from the main framework 3, and holds holding means such as clamps 11, or other tooling such as a dedicated spot welder. The inner framework 9 is located nearer to the mid-line of the apparatus than are the pillars 1 of the fixed stand.

In use, the holding apparatus would form part of a work station along a vehicle assembly line. In operation, the main framework 3 would first be lifted into its raised position, carrying the inner framework 9 clear of the path of vehicles passing down the assembly line. Next, a part-assembled vehicle body shell, typically mounted on a transportation device such as a truck, would be moved between the pillars of the fixed stand 1 to a position under the framework 3. When the body shell has been located at precisely the correct position, as shown in broken lines at 13 in the Figures, the framework 3 is lowered.

Because the inner framework 9 is located relatively close to the mid-line of the apparatus, as the main framework 3 is lowered the inner framework 9 passes inside the vehicle body shell. The inner framework 9 enters the vehicle body shell through apertures such as those for the front and rear windscreens and an aperture later to be filled by a body roof panel. The position adopted by the inner framework 9 at this stage is shown in broken lines in FIG. 2.

Figure 2:
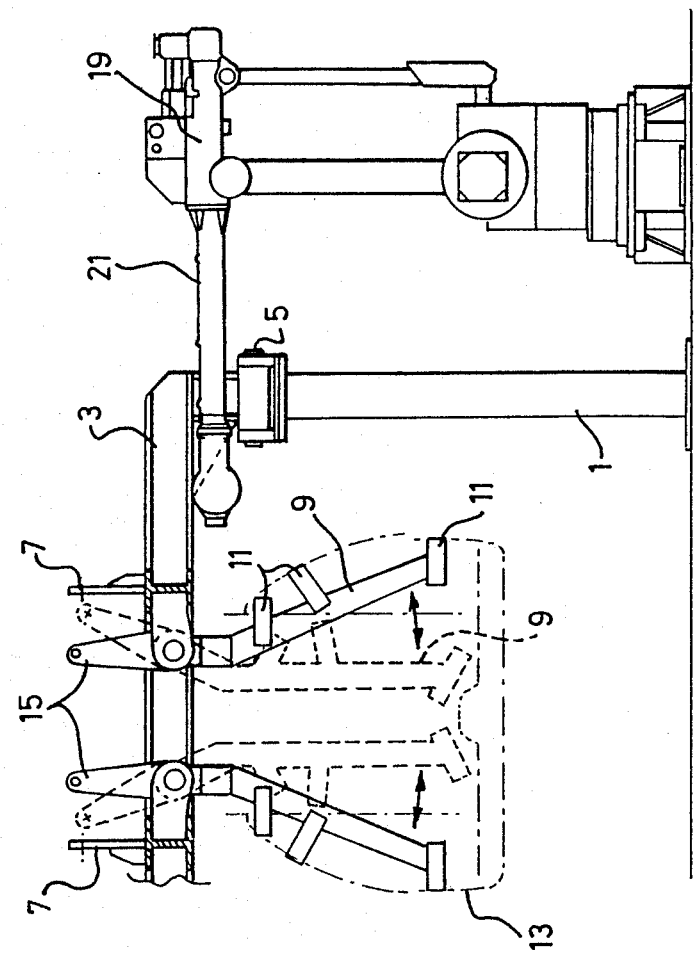
FIG. 2 is an end view of the apparatus of FIG. 1.

The inner framework 9 is movably mounted on the main framework 3, and an actuation means such as a hydraulic cylinder is connected to the inner framework 9 at a connection point 15 in order to move the inner framework relative to the main framework 3. As shown in FIG. 2, the inner framework will typically comprise left and right halves, each with its own connection point 15.

The inner framework 9 will now be moved relative to the main framework 3 so as to carry the clamps 11 or other tooling outwardly towards the sides of the vehicle body shell. The inner framework 9 will be moved by a predetermined amount, and the clamps 11 or other tooling will have previously been positioned on the inner framework 9 so as to be carried by this movement into the desired positions relative to the vehicle body shell. The position now occupied by the inner framework 9 is shown in continuous lines in FIG. 2. The clamps 11 are now actuated so that clamp pincers or fingers 17 (FIG. 1) grasp the vehicle body shell firmly in a number of places.

The vehicle body shell is now firmly clamped in position, and assembly operations can now be performed on it. The assembly line station may be provided with robots 19 (FIG. 2) which carry out some or all of the assembly operations by means of movable arms 21 (FIGS. 2 and 3).

Figure 3:
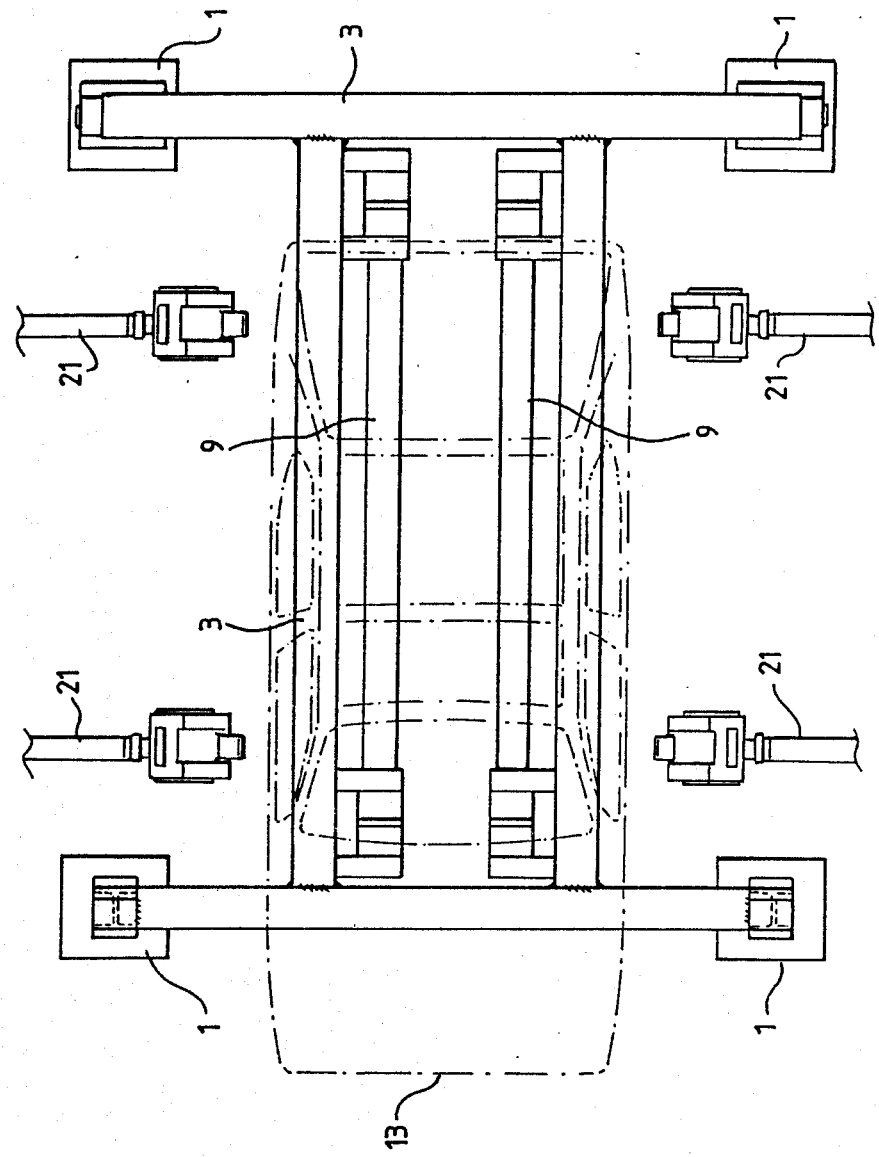
FIG. 3 is a top view of the apparatus of FIG. 1.

It can be seen from FIGS. 2 and 3 that the inner framework 9 which supports the clamps 11 does not extend outwardly of the sides of the vehicle body shell. Thus it does not interfere with the movement of the robot arms 21 or any other assembly machines or any workers who approach the body shell from the outside.

Additionally, tooling used in the assembly operations may be mounted on the inner framework 9 or the main framework 3. This is particularly useful in cases where the tooling has to approach some part of the vehicle body shell from the inside. A spot welder for making welds on the inside of a vehicle boot is an example of such a tool.

Once the assembly operations have been carried out, the clamps 11 release the vehicle body shell and the main framework 3 is lifted again to carry the inner framework and the clamps 11 clear of the vehicle body. The vehicle body is then carried away to the next station on the assembly line.

It is convenient if the inner framework 9 includes means, such as slides, to vary the positions of the clamps 11. In this way, the positions at which the apparatus grasps the vehicle body shell can be varied so as to adapt the apparatus for use with different vehicle models. Means for varying the positions of the clamps will tend to increase the bulk of the inner framework 9. However, since the inner framework 9 holds the clamps 11 from inside the vehicle body shell this additional bulk does not obstruct the performance of assembly operations on the outside of the body shell by the robot arms 21 etc.

It is also possible to provide for the handling of different models to some extent without varying the positions of the clamps 11, merely by providing extra clamps 11 on the inner framework 9 which are only used with some models. For instance, at the top rear of the car body outline shown in FIG. 1, the three alternative outlines are shown for a saloon or sedan, a hatchback and an estate versions of the same car. It can be seen that one clamp 11 is used only with the hatchback version and two clamps are used only with the estate. Again, this provision of clamps which will not be used with a particular model adds to the bulk of the inner framework 9, but this additional bulk is located out of the way of the robot arms 21 etc.

The arrangement shown, in which the main framework 3 can be pivoted upwardly from the fixed stand 1 is suitable for incorporation in a pre-existing assembly line since it does not require the vehicle body shell to be raised or lowered by any significant amount. However, if holding apparatus embodying the present invention is being incorporated in a new assembly line, it will normally be advantageous to provide means for lifting the vehicle up around the inner framework 9 rather than raising the framework and then lowering it so that the inner framework 9 passes into the vehicle body shell.

The illustrated embodiment is an example only, and variations are possible. For instance, the inner framework 9 can enter the vehicle body shell through other apertures. In particular, in cases where the vehicle body shell does not include a floor the apparatus can be arranged so that the inner framework enters the vehicle body shell from beneath.

We claim:

1. Apparatus for holding a partly assembled vehicle body having at least one aperture in the body for access to the interior thereof, comprising a main holding structure, vehicle holding means mounted on said main structure, and moving means to effect relative movement between said body and said holding means so that said holding means passes into said interior of the body through said aperture to enable it to clamp the body from the inside thereof by engagement with the respective insides of the body.

2. Apparatus as claimed in claim 1 in which said holding means comprises a pair of inner frames moveable outwardly to approach said inner sides of the said body to clamp it from inside.

3. Apparatus as claimed in claim 2 in which said inner frames are actuated by a hydraulic cylinder.

4. Apparatus as claimed in claim 1 further comprising a vehicle assembly tool and means mounting said tool to said holding means, whereby the tool is moveable into the interior of the vehicle body.

5. Apparatus as claimed in claim 1 in which said at least one body aperture is upwardly directed and said moving means effects movement of said holding means through said aperture.

6. Apparatus as claimed in claim 1 in which said main structure is supported on two pairs of pillars adapted in use to straddle a vehicle body.

7. Apparatus as claimed in claim 6 in which said main structure is pivotably mounted on one of said pairs of pillars, said moving means being operable to effect pivoting of said structure and said holding means about said one pair of pillers.

8. Apparatus as claimed in claim 4, in which said vehicle assembly tool comprises a spot welder.

9. Apparatus for holding a partly assembled vehicle body having at least one aperture in the body for access to the interior thereof, comprising a main holding structure, vehicle holding means mounted on said main structure, and moving means to effect relative movement between said body and said holding means so that said holding means passes into said interior of the body through said aperture to enable it to hold the body, said main structure being supported on two pairs of pillars adapted in use to straddle said body, said main structure being pivotally mounted on one of said pairs of pillars, and said moving means being operable to effect pivoting of said structure and said holding means about said one pair of pillars.

10. Apparatus as claimed in claim 9 in which said holding means comprises a pair of inner frames moveable outwardly to approach the said inner sides of the said body to clamp it from inside.

11. Apparatus as claimed in claim 9 in which said inner frames are actuated by a hydraulic cylinder.

12. Apparatus as claimed in claim 9 further comprising a vehicle assembly tool and means mounting said tool to said holding means, whereby the tool is moveable into the interior of the vehicle body.

13. Apparatus as claimed in claim 9 in which said at least one body aperture is upwardly directed and said moving means effects movement of said holding means through said aperture.

* * * * *